United States Patent [19]
Honda

[11] 3,854,795
[45] Dec. 17, 1974

[54] LIGHT MODULATION DEVICE

[75] Inventor: Masanori Honda, Yokohama, Japan

[73] Assignee: Fujitsu Limited, Kawasaki, Japan

[22] Filed: Jan. 26, 1973

[21] Appl. No.: 326,950

[30] Foreign Application Priority Data
Feb. 1, 1972    Japan.............................. 47-11719
Feb. 4, 1972    Japan.............................. 47-12648
Feb. 4, 1972    Japan.............................. 47-12649

[52] U.S. Cl............................................. 350/160 R
[51] Int. Cl................................................ G02f 1/28
[58] Field of Search ...... 350/160; 317/235, DIG. 27

[56] References Cited
UNITED STATES PATENTS
3,548,214    12/1970    Brown, Sr. ............................ 317/235

*Primary Examiner*—William L. Sikes
*Attorney, Agent, or Firm*—Daniel Jay Tick

[57] ABSTRACT

A light modulation element providing intensity modulation of light comprises a pair of substrates provided with electrodes. Layers of material having the Franz-Keldysh effect cover the electrodes. The substrates overlap each other so that the layers of both substrates are opposed.

14 Claims, 18 Drawing Figures

LIGHT MODULATION DEVICE

BACKGROUND OF THE INVENTION

1. Field of the Invention

The present invention relates to a light modulation element. More particularly, the invention relates to a light modulation element utilizing the Franz-Keldysh effect

2. Description of the Prior Art

How to load a signal on light is one of the most important matters in optical communication system. Elements which load a signal on light and produce a light pulse are called modulation elements. One type of modulation element provides intensity modulation of light by voltage signals, utilizing the Franz-Keldysh effect. The Franz-Keldysh effect, hereinafter referred to as the FK effect, is that the fundamental absorption edge wavelength of a substance is moved to the side of the long wavelength when an electric field is applied to the substance. Substances having the FK effect are semiconductors such as, for example, cadmium sulfide (CdS), cadmium selenite (CdSe), cadmium telluride (CdTe), silicon (si), gallium arsenide (GaAs), germanium (Ge), lead iodide (PbI$_2$), titanium oxide (TiO$_2$), etc. The single crystals of the substances are generally widely used as light modulation elements, and particularly the single crystal of cadmium sulfide is frequently used.

An example of a light modulation element using a single crystal of cadmium sulfide is as follows. A single crystal of cadmium sulfide requires an electric field of about 10$^5$ V/cm in order to provide the FK effect. Since a single crystal with a sufficiently high specific resistance cannot be obtained, the modulation element comprises plate glass coated with stannic oxide (SnO$_2$) and laminated so that the transparent electrodes are opposed towards the inside. A cadmium sulfide single crystal thin wafer placed between thin insulators such as, for example, Mylar film having a thickness of 10 microns, is positioned between the electrodes. When the voltage for providing the electric field, which voltage is approximately 10$^5$ V/cm is applied to the single crystal of cadmium sulfide between the electrodes of the modulation element, the fundamental absorption wavelength of approximately 5000 A moves to the side of the long wavelength. Consequently, the transmissivity of light of 5000 to 5300 A near the side of the long wavelength of the fundamental absorption edge wavelength is changed. When a modulation element of this type is irradiated by light of approximately 5300 A wavelength, the intensity of the transmitted light varies with the variation of voltage applied between the electrodes of the modulation element. The intensity modulation of light is thus achieved.

In the aforedescribed light modulation element, due to the cadmium sulfide single crystal thin wafer of low resistivity and the insulators of high resistivity holding it, the greater part of the electric field is distributed to the insulators. Furthermore, sufficiently thin cadmium sulfide single crystal wafers are difficult to obtain. Also, the interval between the electrodes is wide, to some extent. Due to the foregoing reasons, the modulation element requires a high voltage of 1000–3000V between the electrodes in order to obtain an electric field of about 10$^5$ V/cm in the single crystal of cadmium sulfide.

It is difficult to obtain an electric pulse of high speed by such high voltage, so that the modulation element cannot be ultimately put into practical use. Therefore, a light modulation element with a film instead of the single crystal is considered. In a light modulation element using a cadmium sulfide single crystal, a light modulation element having a film of material having the FK effect and transparent electrode materials coated on the substrate by vacuum evaporation, etc., and a film of material having the FK effect sandwiched between the transparent electrode materials is considered as one method for eliminating the disadvantage of requiring a high driving voltage. However, since film of material having the FK effect of high resistivity cannot be obtained, it is difficult to provide an electric field as high as 10$^5$ V/cm to such films. Moreover, since film of material having the FK effect is generally comparatively rough, when a high electric field is applied to such film in a light modulation element of the aforedescribed typed, a short-circuit through pin holes of the film tends to occur. A thick film is required to prevent this. A thick film requires a high driving voltage and causes a decrease in transmissivity. Thus, light modulation elements of the prior art utilizing the FK effect require a high driving voltage and are consequently difficult to use, practically. When sufficiently high transmissivity is provided, the modulation degree obtained is only several per cent.

Furthermore, since light modulation elements of the prior art utilizing the FK effect make use of only the FK effect, the wavelength of modulatory light is limited to the narrow range near the fundamental absorption edge wavelength of utilized materials having the FK effect. In consideration of the advantages of laser presently utilized in optical communication systems, light modulation elements of the prior art in which the modulatory wavelength is limited to the narrow range depending upon the materials used are not desirable.

An object of the invention is to provide a light modulation element which can be operated at low voltage.

Another object of the invention is to provide a light modulation element by which the modulatory wavelength of light can be settled at the optional wavelength.

Still another object of the invention is to provide a light modulation element by which a large degree of modulation can be obtained.

Yet another object of the invention is to provide a light modulation element suitable for a light integrated circuit.

BRIEF SUMMARY OF THE INVENTION:

In accordance with the invention, the foregoing objects are achieved first by overlapping a pair of transparent substrates provided with electrodes and layers of material for light modulation covering the electrodes on the substrates so that the layers of material of both substrates for modulating light are opposed to each other, and secondly by using semiconductors having the FK effect as the materials for modulating light in the light modulation element. The pair of substrates having a longer wavelength than the fundamental absorption edge wavelength of the semiconductors are overlapped under pressure causing a decrease of the spectro-transmission characteristic by providing a high electric field. The invention confirms that in a light modulation element of the aforedescribed type, a barrier is formed at the boundary of the combined parts of the semiconductors having the FK effect and the gap, a high electric field is provided at the barrier, the FK effect occurs at the barrier, and, consequently, the operation can be performed at low voltage.

In the light modulation element of the invention, the driving voltage of tens of volts is applied between the electrodes, the light to be modulated is irradiated from the side of one of the substrates, intensity modulation is performed in accordance with the driving voltage during transmission through the barrier formed on the semiconductors having the FK effect, and the modulated light is derived from the side of the other of the substrates. One of the substrates or electrodes may be opaque metal. In this case, the light to be modulated is irradiated from the side of the other transparent substrate, reaches the metal substrate or electrode via the semiconductor layer having the FK effect and is reflected, and the modulated light is derived from the transparent substrate via the semiconductor layer.

In accordance with the invention, the light modulation element may be driven at low voltage, is suitable for a light integrated circuit, and has a higher degree of modulation. The light modulation element is operated by introducing light into the layer of material for light modulation formed on the one of the substrates and deriving modulated light from the layer of material for modulating light on the other of the substrates.

The light to be modulated may be introduced into the material layer for modulating light and the modulated light may be derived by introducing the light into a film light guide of a layer of material for light modulation extended on a substrate, and using conventional prism couplers, grating couplers, taper couplers, etc., fitted on the film light guide for deriving modulated light from the film light guide.

The invention confirms that optical coupling occurs between the opposed material layers for modulating light in the light modulation element. The light introduced into the one film light guide reaches the combined part of the material layer for modulating light and causes optical coupling with the other material layer for modulating light a number of times, and is modulated at the high electric field portion formed at the boundary of the layer of material for modulating light and the gap, that is, the barrier, every time optical coupling occurs. Consequently, a high degree of modulation is obtained. The modulation element is suitable for a light integrated circuit because of propagation of light along the interior of the film.

In accordance with this invention, the light modulation element of the invention, which may be driven at low voltage, has a higher degree of modulation and permits optional selection of the used wavelength of light, is obtained by fitting film having an interference effect in a layer of material for modulating light in the light modulation element. In the light modulation element, the high degree of modulation is obtained at the operating wavelength by determining the index of refraction and the thickness of the film, so that the film succeeds in providing an interference effect at a desired wavelength longer than the fundamental absorption end wavelength.

BRIEF DESCRIPTION OF THE DRAWINGS

In order that the invention may be readily carried into effect, it will now be described with reference to the accompanying drawings, wherein.

In the FIGS., the same components are identified by the same reference numerals.

Figure 1:
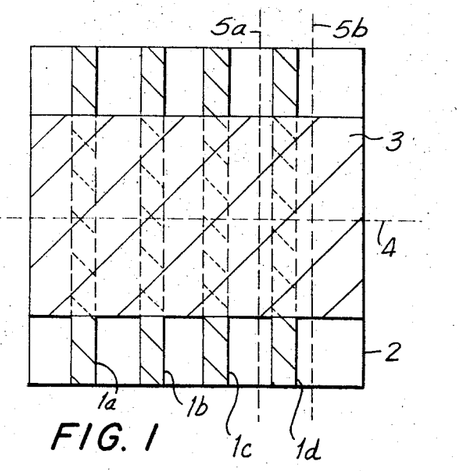
FIG. 1 is a top plan of the glass substrate in the manufacturing process of an embodiment of the light modulation element of the invention.

DETAILED DESCRIPTION OF THE INVENTION:

In FIG. 1, a glass substrate 2 is coated with nesa film strips 1a, 1b, 1c and 1d of $SnO_2$ as transparent electrodes. This is a product of the Corning Glass Company, available under the trade names Corning 7059 and 7740.

The substrate is 0.8 mm thick and 53 mm square. The patterning for the strips of nesa film coated on the whole surface of one side of the substrate is accomplished by an etching solution of zinc and hydrochloric acid. The strips are 3 mm wide and the strips are at intervals of 5 mm. The unit is then supersonically washed by isopropylalcohol and deionized water and dried.

The unit is arranged in a spattering apparatus and coated with cadmium sulfide film 3, 0.5 to 1 micron in thickness, which is a film of material having the FK effect and is the material layer for modulating light, by the use of a metal mask, as shown in FIG. 1. The mask divides the substrate 2 by a sectional line 4 and the substrate is cut off along sectional lines 5a and 5b to provide a plurality of fragments, of which a fragment 6d is shown in FIG. 2.

Figure 2:
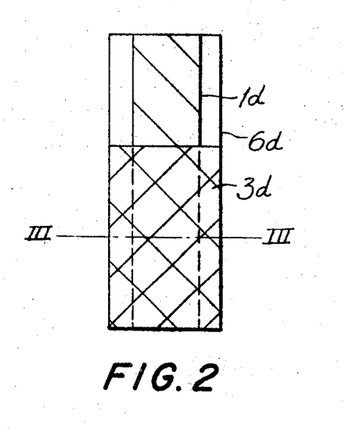
FIG. 2 is a top plan of a fragment cut from the glass substrate of FIG. 1.
Figures 3, 4:
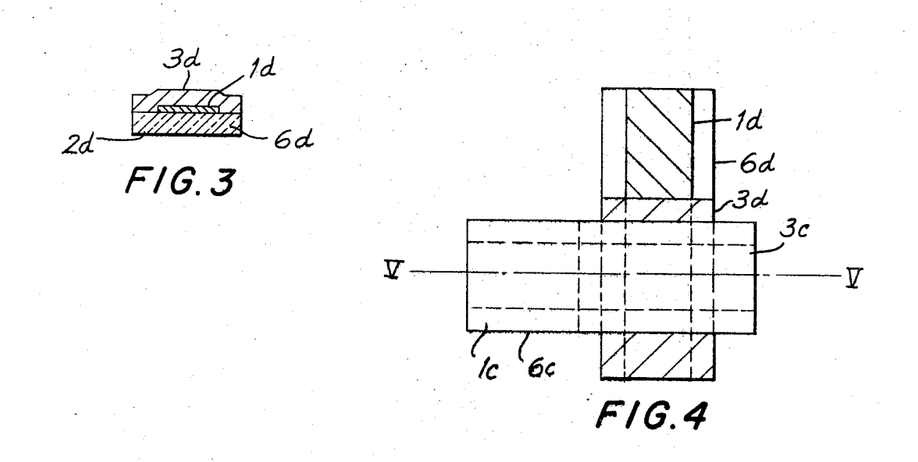
FIG. 3 is a sectional view, taken along the lines III — III, of the fragment of FIG. 2.
FIG. 4 is a top plan of an embodiment of the light modulation element of the invention.
Figure 5:
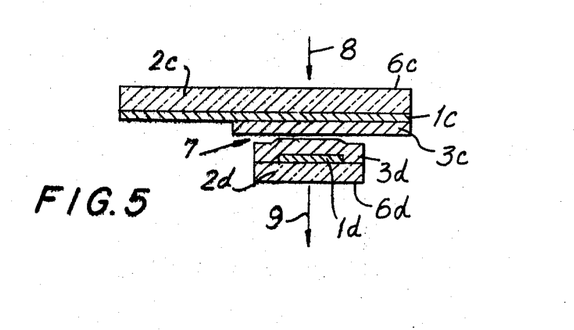
FIG. 5 is a sectional view, taken along the lines V — V, of FIG. 4.

FIG. 2 is an enlarged top plan of the fragment 6d. FIG. 3 is a sectional view, taken along the lines III — III of FIG. 2. In the embodiment of FIG. 4, a pair of fragments 6d and 6c are overlapped in orthogonal array, so that the layers of material for modulating light are opposed. The combining pressure need not be specially high and may be a weight of several grams. FIG. 5 is a sectional view, taken along the lines V — V of FIG. 4.

To facilitate the fitting of electrode lead wires, an organic conductive binding material of Dotite is spread on the nesa films 1a, 1b, 1c and 1d exposed on the fragments 6a, 6b, 6c and 6d. FIGS. 4 and 5 illustrate the complete transmitting type light modulation element. The driving voltage is applied between the nesa films 1c and 1d of transparent electrodes on each substrate 2c and 2d. A thin barrier is formed at the boundary of the cadmium sulfide films 3c and 3d and the gap 7. A part of the voltage applied between the transparent electrodes, which are the nesa films 1c and 1d, is distributed at the barrier and a high electric field is provided at the barrier.

The FK effect occurs at the barrier. More particularly, at the barrier, the transmissivity of light with a wavelength on the side of the longer wavelength than the fundamental absorption edge wavelength of cadmium sulfide varies with the intensity of the electric field applied to the barrier. The intensity of the electric field corresponds to the voltage applied to the nesa films 1c and 1d. Therefore, the intensity of light transmitted by the light modulation element varies with the magnitude of voltage applied between the nesa films 1c and 1d. The spectro-transmission characteristic near the fundamental absorption edge wave-length of cadmium sulfide of the light modulation element is shown in FIG. 6.

Figure 6:
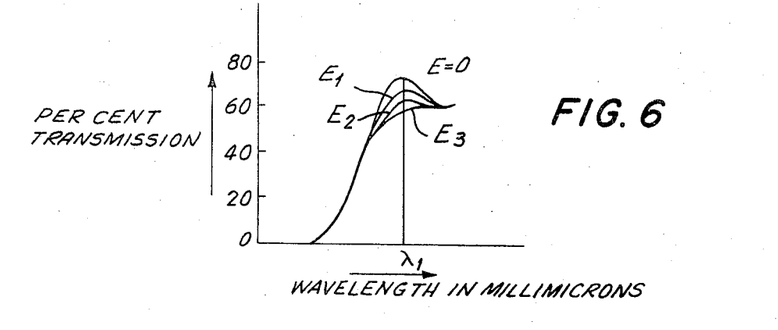
FIG. 6 is a graphical presentation of the transmission characteristic of the light modulation element of the embodiment of FIGS. 4 and 5.

In FIG. 6, E is the voltage applied between the nesa films 1c and 1d and $E_1 < E_2 < E_3$, when the magnitude of E is within the range of 10 to 50 volts.

As shown in FIG. 5, the incidence of light having a wavelength $\lambda_1$, as shown in FIG. 6, is in the direction of an arrow 8 and the modulated light is derived through the light modulation element in the direction of an arrow 9. The intensity of the derived modulated light is determined by the transmissivity of the light modulation element, varying with the magnitude of voltage applied to the nesa films 1c and 1d. The intensity modulation of light is thereby achieved.

In the aforedescribed embodiment of the transmitting type light modulation element, the spectro-transmission characteristic varies in accordance with the combining pressure of the fragments 6c and 6d. The spectro-transmission characteristic of the minute variations of the combining pressure is shown in FIGS. 7 and 8.

Figure 7:
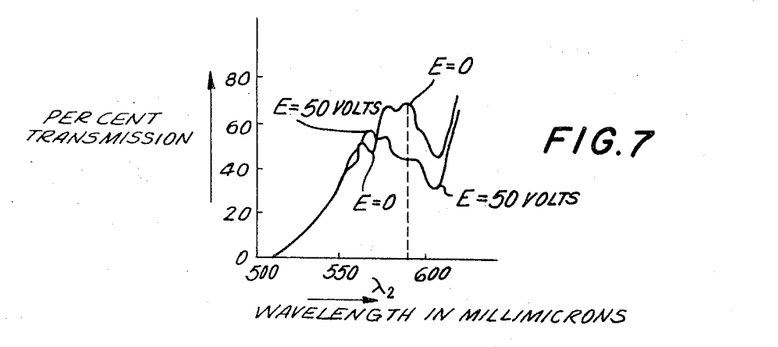
FIGS. 7 and 8 are graphical presentations of the spectro-transmission characteristics, in minute variations of combining pressure, of the light modulation element of the embodiment of FIGS. 4 and 5.
Figure 8:
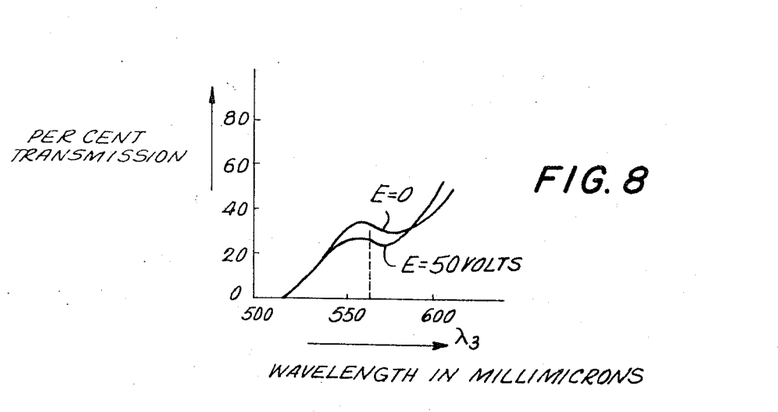

In each of FIGS. 6, 7 and 8, the abscissa represents the wavelength in millimicrons and the ordinate represents the per cent transmission.

In the embodiment of FIGS. 4 and 5 of the light modulation element of the invention, when the fragments 6c and 6d are combined with a variation in pressure, the complex spectro-transmission characteristic shown in FIG. 7 is obtained if an interference fringe such as Newton's rings is observed, and the spectro-transmission characteristic shown in FIG. 8 is obtained if an interference fringe such as several parallel lines is observed. The pressure is a weight of several grams, in any event. For a light modulation element having the spectro-transmission characteristic shown in FIG. 7, the maximum modulation factor is obtained by the use of light having a wavelength near $\lambda_2 = 590$ millimicrons. For a light modulation element having the spectro-transmission characteristics shown in FIG. 8, the maximum modulation factor is obtained by the use of light having a wavelength near $\lambda_3 = 560$ millimicrons.

Figure 17:
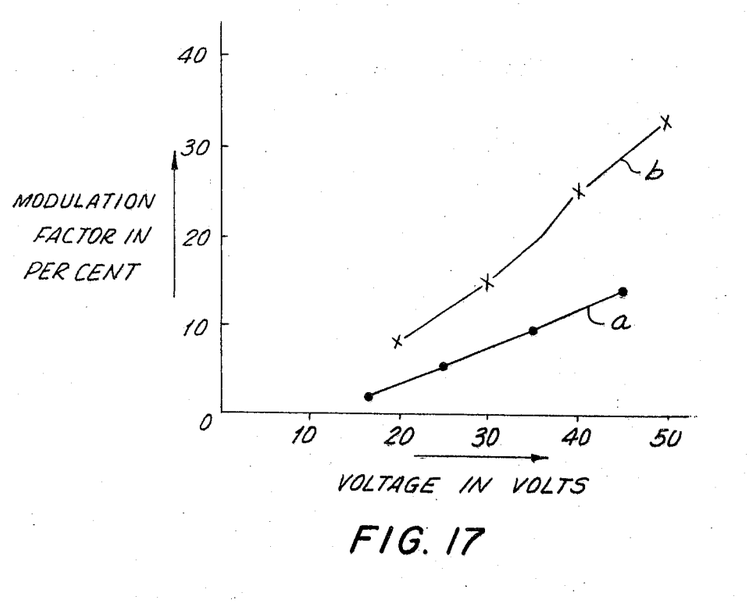
FIG. 17 is a graphical presentation of the relation between the modulation factor and the applied voltage of the light modulation element of the embodiment of FIG. 14.

In FIG. 17, the abscissa represents the voltage in volts and the ordinate represents the modulation factor in per cent. In FIG. 17, the modulation factor for the voltage applied between the transparent electrodes of the fragments 6c and 6d of the light modulation element combined by pressure under which the maximum factor can be obtained is shown by the curve a. If the transmissivity is Io when the voltage is 0, and the transmissivity is IE when the voltage is applied, the modulation factor is defined as (Io—IE)/Io. Furthermore, the value of the modulation factor shown in FIG. 17 is obtained by measurement of the transmissivity of a helium-neon laser light having a wavelength of 632.8 millimicrons.

In the light modulation element of the embodiment of FIGS. 4 and 5, a maximum value of about 15 percent modulation factor is obtained at a driving voltage of 50 volts or less, as shown in FIG. 17. In this case, the transmissivity of the light modulation element becomes about 40 to 70 percent when the applied voltage is zero and the high modulation factor is obtained.

In the embodiment of FIGS. 4 and 5, various materials may be used instead of cadmium sulfide and $S_nO_2$. Indium oxide, gallium oxide, lead oxide, etc., may be used as the material of the transparent electrodes, instead of stannic oxide. When cadmium sulfide is used as the material for modulating light, the electrode materials are suitable for providing ohmic contact, and any other conductive material with sufficient transmissivity for modulated light may be used. Any insulation material which can maintain sufficient transmission of modulated light may be used as the transparent substrate 2. Any semiconductor having the FK effect may be used as the material for modulating light.

Figure 9:
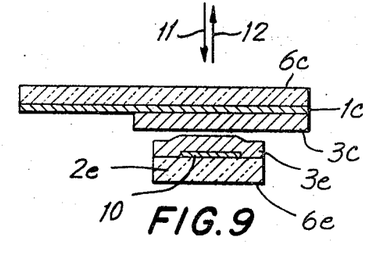
FIG. 9 is a sectional view of another embodiment of the light modulation element of the invention.

Metal, with a high reflection factor may be used as the material of the one electrode in the light modulation element of the embodiment of FIGS. 4 and 5. The embodiment of FIG. 9 utilizes a reflecting type light modulation element. In FIG. 9, the fragment 6c is the same as the fragment 6c of the embodiment of FIGS. 4 and 5 and a laminated layer 10 of a film of a nickel-chrome alloy and gold is used in the fragment 6e instead of the nesa film 1d of tin oxide as the electrode material. The electrode 10 comprises a laminated layer of films of a nickel-chrome alloy and gold. The electrode 10 is formed by coating a nickel-chrome alloy of 500 A in thickness and next gold of 3000 A in thickness on the glass substrate 2e in due order by vacuum evaporation, etc., and by patterning.

A cadmium sulfide film 3e having a thickness of 0.5 to 1.0 micron is coated by spattering in the same way as in the embodiment of FIGS. 4 and 5. Two fragments 6c and 6e are combined as shown in FIG. 9. The reflecting type light modulation element is then provided in the same process as the embodiment of FIGS. 4 and 5. In the reflecting type light modulation element, light to be modulated is irradiated in the direction of an arrow 11 and the light is transmitted through the glass substrate 6c, the nesa film 1c and the cadmium sulfide films 3c and 3e and is reflected at the surface of the gold film of the electrode 10. Consequently, modulated light is derived in the direction of an arrow 12. The derived light is intensity-modulated in accordance with the voltage applied between the nesa film 1c and the laminated layer 10 of the film of nickel-chrome alloy and gold.

In the light modulation element of the embodiment of FIG. 9, the transmissivity of the light (helium-neon laser light having a wavelength 632.8 millimicrons) is about 30 percent when the applied voltage is zero, and is inferior to the light modulation element of the embodiment of FIGS. 4 and 5, because in the light modulation element of FIG. 9, the light is transmitted via the cadmium sulfide films 3c and 3e with comparatively greater transmission loss, twice, and there is loss in the reflection at the surface of the gold film. However, the modulation factor is about 1.2 times as great as the modulation factor of the light modulation element of the embodiment of FIGS. 4 and 5. The modulation factor is improved because the light is transmitted through the barrier formed in the cadmium sulfide twice.

Figure 10:
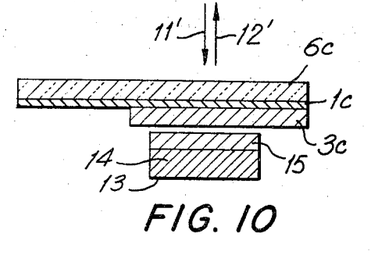
FIG. 10 is a sectional view of another embodiment of the light modulation element of the invention.

Therefore, a larger reflection factor on the surface of the metallic electrode 10 is desired for increasing the transmission factor of the light modulation element. Metal may be coated on the glass substrate by a spattering method, but the reflection factor at a surface obtained by rapid evaporation in a high vacuum is generally larger than that at a surface obtained by spattering. The reflection factor at the surface of the gold film of the embodiment of FIG. 9 is 90 percent or more for light having a wavelength of 632.8 millimicrons. Generally, since metal has a high reflection factor and high conductivity, many kinds of other metallic films can be used in the embodiment of FIG. 9, instead of films of a nickel-chrome alloy and gold. Since silver, aluminum, copper, etc., for example, have reflection factors of 90 percent or more, these films are suitable. The conductivity need not be particularly high, and may be sufficiently greater in comparison with the material for modulating light. Also, the substrate for the metallic electrode may be an opaque insulating material. The embodiment of FIG. 9 may be changed to other embodiments, which other embodiments are hereinafter described. In the embodiment of FIG. 10, the fragment 6c is the same as the fragment 6c of the embodiment of FIGS. 4 and 5. A fragment 13 comprises an aluminum substrate 14 having a thickness of 1 mm and the same size as the fragment 6c and has an optically polished surface. A cadmium sulfide film 15, 0.5 to 1.0 microns thick, is coated on the polished surface of the aluminum substrate 14 to form the fragment 13. The film 15 is coated on the substrate 14 by spattering. The fragments 6c and 13 overlap each other, as shown in FIG. 10 to provide a reflecting type light modulation element.

Light to be modulated is irradiated from the side of the fragment 6c in the direction of an arrow 11', is reflected at the surface of the aluminum substrate 14, and modulated light is derived in the direction of an arrow 12'. The aluminum substrate 14 serves as an electrode at the same time, and the driving voltage is applied between the nesa film 16 and the aluminum substrate. The modulation factor and the transmissivity of the reflecting type light modulation element of the embodiment of FIG. 10 are equivalent to those of the reflecting type light modulation element of the embodiment of FIG. 9.

A short-circuit tends to occur between the exposed edge face of the aluminum substrate 14 and the nesa film 16 in the embodiment of FIG. 10. However, the shortcircuit may be prevented by a cover of insulators on the exposed part of the aluminum substrate 14.

The aforedescribed three embodiments of the light modulation element provide effects which the light modulation element of the prior art using the FK effect could not obtain. One of these effects is that modulation in the light modulation element can be performed at a wavelength greater than 1.0 micron. The modulatable wavelength is not limited to near the fundamental absorption edge wavelength of the material for modulating light, and modulation in a wide range of wavelengths is possible. It is considered that the modulatable wavelength in the light modulation element is in the wide range because of the interaction between the FK effect and the interference effect of the films and the gap. This interaction is hereinafter described in detail in another embodiment of the light modulation element utilizing such interaction most.

A light modulation element of which both electrodes are made of metal having a high reflection factor are considered as a transformation of the light modulation element. In this case, the light to be modulated is irradiated on the cadmium sulfide film from an end of the combined part of the light modulation element, reflection between the electrodes is repeated, and modulated light is derived from the other end. However, it is difficult, because of the very thin cadmium sulfide film to irradiate the light from an end of the light modulation element. Therefore, a light modulation element of the hereinafter described embodiment is provided.

Figure 11:
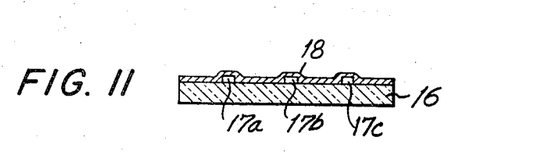
FIG. 11 is a sectional view of a substrate in the manufacturing process of another embodiment of the light modulation element of the invention.
Figure 12:
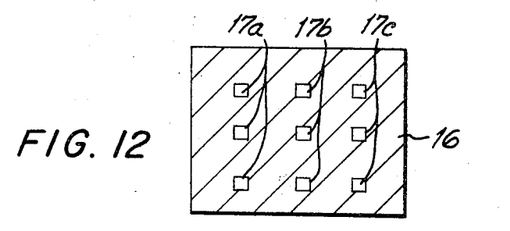
FIG. 12 is a plan view of the substrate of FIG. 11.

In the embodiment of FIGS. 11 and 12, a nickel-chrome alloy and gold are coated on a glass substrate 16. The substrate 16 may comprise a product of the Corning Glass Company, available under the tradename Bycor Glass. The substrate is 0.8 mm thick and 53 mm square. The coating is accomplished by vacuum evaporation. The laminated layer of the nickel-chrome and the gold films is selectively etched and electrodes 17a, 17b and 17c are formed. The electrodes 17a, 17b and 17c are 2 mm square. A cadmium sulfide film 18, about 800 millimicrons thick, is coated on the substrate 16 and electrodes 17a, 17b and 17c by high frequency spattering. FIG. 11 is a sectional view and FIG. 12 is a top plan of a specimen of the embodiment of FIG. 13. The specimen is about 18 mm square.

Figure 13:
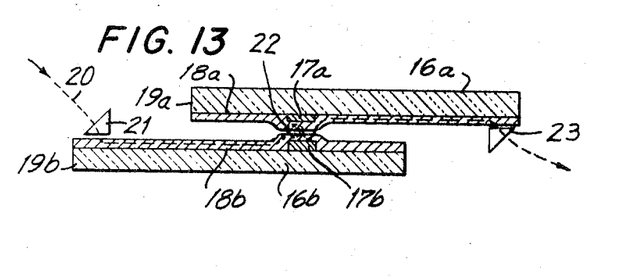
FIG. 13 is a sectional view of another embodiment of the light modulation element of the invention comprising a fragment cut from the substrate of FIGS. 11 and 12.

In the embodiment of FIG. 13, a pair of specimens 19a and 19b, each identical with the specimen of FIGS. 11 and 12, overlap each other to produce the light modulation element. In the embodiment of FIG. 13, YAG laser light 20, having a wavelength of 1.06 microns, is introduced into the cadmium sulfide film 18b of the fragment 19b as the light to be modulated. A prism coupler 21, shown in FIG. 13, introduces the light into the cadmium sulfide film 18b. Grating couplers, taper couplers, etc., may be used instead of prism couplers.

Prism couplers are described in "Theory of Prism-Film and, etc.," Journal of the Optics Society of America, Vol. 60, No. 10, October, 1970. Grating couplers are described in "Grating Coupler for, etc.," Applied Physics Letters, Vol. 16, No. 12, June, 1970. Taper couplers are described on page 398, Applied Physics Letters, Vol. 18, 1971.

The YAG laser light 20 is propagated in the cadmium sulfide film 18b as a film light guide. YAG laser light, which is small in loss, is used in the propagation in the cadmium sulfide film 18b, because of large loss in helium-neon laser light having a wavelength of 632.8 millimicrons. When the light propagated in the cadmium sulfide film 18b reaches a combined part 22, coupling occurs between it and the cadmium sulfide film 18a of the other specimen 19a. The light propagated through the coupling moves to the cadmium sulfide film 18a, propagates therein, returns to the cadmium sulfide film 18b, and then returns to the cadmium sulfide film 18a and propagates therein. The number of times of the movement of light from one cadmium sulfide film to the other at the combined part 22, or the coupling, can be optionally changed by changing the length of the combined part. The light propagating in the cadmium sulfide film 18a is derived via a prism coupler 23. Grating couplers or taper couplers may be used instead of the prism coupler 23.

When a voltage of 30 volts is applied between the electrodes 17a and 17b, the light propagated through the one film causes coupling at the combined part 22, is subjected to the FK effect every time it is transmitted through the barrier formed in the cadmium sulfide film at the combined part, and the spectro-transmission characteristic is changed.

The light modulation element of the embodiment of FIG. 13 has the advantages that the combined two films having the same propagation constant, easily provide light coupling by which more than two light circuits may be connected at optional locations, a high degree of modulation can be obtained because of the FK effect obtained every time light coupling occurs when the voltage is applied to produce the electric field, and the light modulation element is suitable for a light integrated circuit, because the light is propagated along the inside of the cadmium sulfide films, so that the film light guide can be directly connected to a light integrated circuit.

In the embodiment of FIG. 13 of the light modulation element of the invention, the film light guide comprises films of material for modulating light for introducing light into the films of material of the light modulation element for modulating light and for deriving light modulated inside the film of material for modulating light. Light couplers fitted on the film light guides are used to introduce the light into the film light guide and to derive the modulated light. The materials which form the film light guides are not limited to films of material for modulating light. The propagation of light through the inside of the film light guide formed on the substrate requires a film light guide with a refractive index larger than that of the substrate. For example, the refractive index of the cadmium sulfide film of the film light guide in the light modulation element of the embodiment of FIG. 13 is about 2.5, and that of the glass of the substrate is about 1.5. It is obvious that any materials which make the propagation of light in the interior of the film light guide possible can be used as the materials of the substrate. Furthermore, the reflection of light on the surface of the electrodes at the combined part of the light modulation element of the embodiment, of FIG. 13 is not utilized, but light coupling is used. Therefore, conductors which do not have a high reflection factor such as, for example, the nesa film of stannic oxide, may be used as the material of the electrodes.

Since the number of times of coupling at the combined part may be optionally selected, as hereinbefore mentioned, the film light guide may be fitted on one substrate only. In this case, the length of the combined part is determined so that coupling occurs an even number of times. Such a structure is utilized when producing a light modulation element of the embodiment of FIG. 13 for use in a light integrated circuit.

Figure 14:
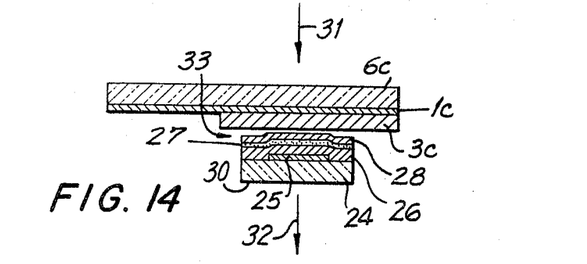
FIG. 14 is a sectional view of another embodiment of the light modulation element of the invention.

The embodiment of FIG. 14 of the light modulation element of the invention utilizes the interaction between the FK effect and the interference effect most. In the embodiment of FIG. 14, the fragment 6c is the same as the fragment 6c of the embodiment of FIGS. 4 and 5. The other fragment 30 has a substrate 24 of Bycor Glass of the Corning Glass Company. A transparent electrode 25 on the substrate 24 comprises indium oxide ($In_2O_3$) and is coated on the substrate by vacuum evaporation, so that a transmissivity of 80 percent, or more, and an area resistance of 50 ohms per square unit, or less, are obtained on the substrate. The substrate 24 is polished so that it has an optical surface.

A cadmium sulfide film 26, about 8000 A thick, is coated on the optical surface of the substrate 24 and the electrode 25 by high frequency spattering, as a film of material for modulating light. Corning 7059 glass 27, about 1500 A thick is coated on the cadmium sulfide film 26 by high frequency spattering. Another cadmium sulfide film 28, about 8000 A thick is coated on the glass 27.

Figure 15:
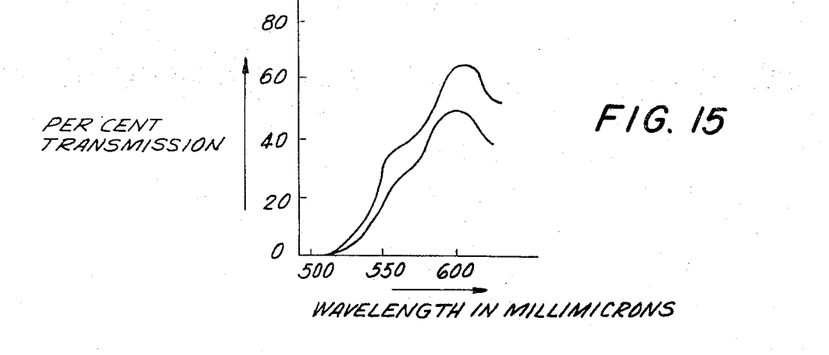
FIG. 15 is a graphical presentation of the spectro-transmission characteristic of the light modulation element of the embodiment of FIG. 14.

The fragments 6c and 30 overlap each other to provide the light modulation element of the embodiment of FIG. 14. Light is irradiated into the light modulation element of FIG. 14 in the direction of an arrow 31 and derived in the direction of an arrow 32. The spectro-transmission characteristic is shown in the curve c of FIG. 15. In FIG. 15, the abscissa represents the wavelength in millimicrons and the ordinate represents the per cent transmission. When a voltage of 20 volts is applied between the electrodes 1c and 25, the spectro-transmission characteristic is indicated by the curve d.

Figure 16:
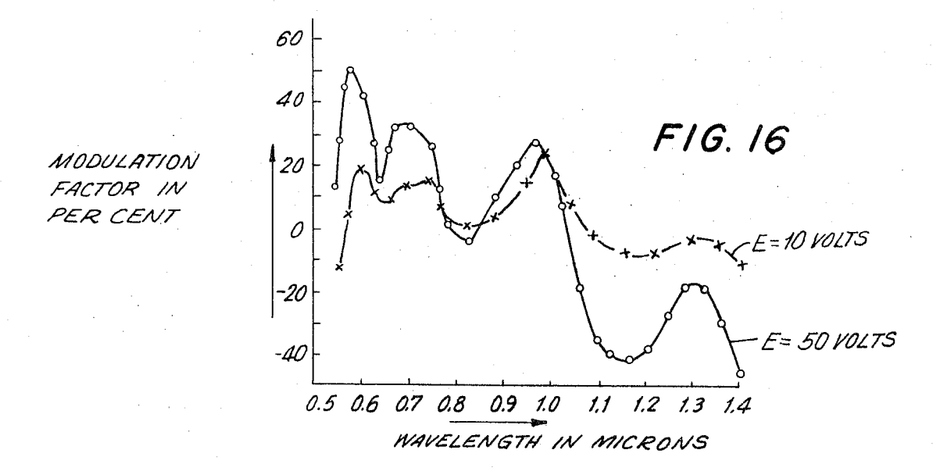
FIG. 16 is a graphical presentation of the modulation factor of the light modulation element of the embodiment of FIG. 14 for wavelengths in a wide range.

FIG. 16 shows the modulation factor of the light modulation element of the embodiment of FIG. 14 on the long wavelength side of the fundamental absorption edge wavelength for a wide range of wavelengths. In FIG. 16, the negative modulation factor indicates that the transmissivity is larger when voltage is applied than when the voltage is zero. The modulation factor for helium-neon laser light, having a wavelength of 632.8 millimicrons, of the light modulation element of the embodiment of FIG. 14 is indicated by the curve b of FIG. 17. It is obvious from FIGS. 16 and 17 that the light modulation element of the embodiment of FIG. 14 provides a high modulation factor in a wide range of wavelengths.

Since an interference phenomenon occurs when light is transmitted via the film, the transmissivity varies in accordance with the thickness and the refractive index of the film, and the wavelength and the angle of incidence of the light. Assuming that the wavelength of light is λ, the angle of refraction of incident light in the film is θ, the thickness of the film is $d$ and the reflection factor is $n$, the following relation is obtained for maximum transmissivity.

$$(k + 1/2)\lambda = 2 \text{ nd } \cos \theta \text{ when,}$$

$$k = 0, 1, 2, \ldots$$

The following relation is obtained for the minimum transmissivity.

$$k\lambda = 2 \text{ nd } \cos \theta \text{ when,}$$

$$k = 0, 1, 2, \ldots$$

In the light modulation element of the invention, the aforedescribed interference effect occurs in the film of material for modulating light, the gap, and the glass film.

When voltage is applied between the electrodes, since the refractive index of the cadmium sulfide film varies due to the FK effect, the barrier is formed on the surface of the cadmium sulfide film and the refractive index of the barrier varies. Consequently, a minute variation substantially occurs in the thickness of each film. It is obvious from the foregoing expressions that the transmissivity varies with variations in the refractive index $n$ and the thickness $d$. Therefore, when voltage is applied between the electrodes, the transmissivity varies in a wide range of wavelengths and the modulation factor shown in FIG. 16 is obtained.

In the aforedescribed embodiments, since the glass film is for providing the interference effect, the aforedescribed interaction is intense and a high modulation factor is obtained. Also, light of optional wavelength can be modulated at a high modulation factor by adequately determining the thickness and the refractive index of the glass film. Furthermore, since the transmissivity varies when the value of $\cos \theta$ is changed in the foregoing equation, it is obvious that the transmissivity of the light modulation element varies with variation of the angle of incidence of light.

Figure 18:
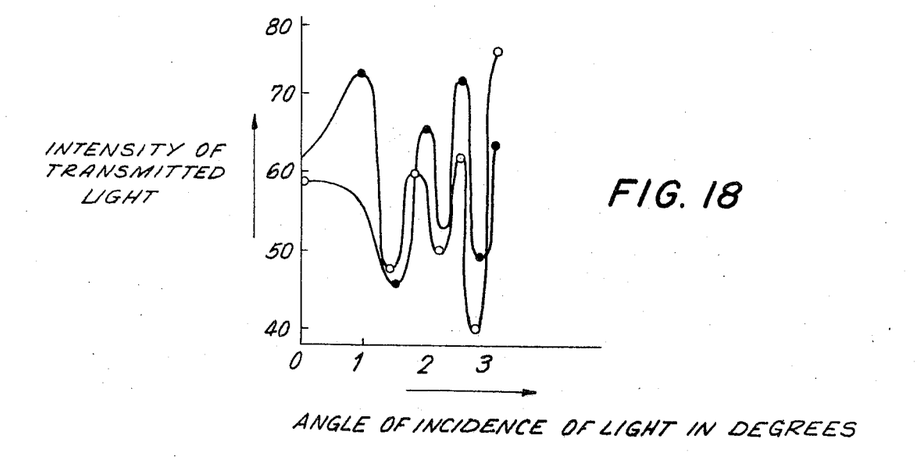
FIG. 18 is a graphical presentation of the relation between the angle of incidence of light and the transmitted light intensity of the light modulation element of the embodiment of FIG. 14.

FIG. 18 shows the variation in the intensity of transmitted light in the light modulation element of the invention with variation of the angle of incidence of light in an interval of 0 to 3 degrees. In FIG. 18, the abscissa represents the angle of incidence of light in degrees and the ordinate represents the intensity of transmitted light. In FIG. 18, the curve $e$ indicates the intensity of transmitted light of helium-neon laser light having a wavelength of 632.8 millimicrons, when the applied voltage is zero and the curve $f$ indicates the intensity of the transmitted light when the applied voltage is 30 volts. It is obvious from FIG. 18 that large variations in the transmissivity and in the modulation factor may be obtained by minute variation of the angle of incidence of light. Therefore, light of optional wavelength may also be modulated at a high modulation factor by adequately determining the angle of incidence of the light.

It is obvious from the foregoing discussion of the interaction between the FK effect and the interference effect, that various modifications of the aforedescribed embodiments of the light modulation element are possible and may be practically used. More particularly, a plurality of films for the interference effect may be utilized and may be provided on both substrates of the light modulation element. Since there is an interference phenomenon in any film of transparent materials, any film of transparent insulation material may be used as the film having an interference effect.

While the invention has been described by means of specific examples and in specific embodiments, I do not wish to be limited thereto, for obvious modifications will occur to those skilled in the art without departing from the spirit and scope of the invention.

I claim:

1. A light modulation element, comprising
a pair of substrates;
a pair of electrodes each on a corresponding one of the substrates; and
a pair of layers of semiconductor material having the Franz-Keldysh effect each covering a corresponding one of the electrodes, the substrates being positioned in overlapping relation with each other with the semiconductor layers facing each other, the semiconductor layers being independent from each other and in loose removable abutment with each other.

2. A light modulation element as claimed in claim 1, wherein both substrates comprise transparent insulators and both electrodes are transparent.

3. A light modulation element as claimed in claim 1, wherein both substrates comprise glass.

4. A light modulation element as claimed in claim 1, wherein each of the electrodes comprises material of the group consisting of stannic oxide, lead oxide, indium oxide and gallium oxide.

5. A light modulation element as claimed in claim 1, wherein the semiconductor material having the Franz-Keldysh effect comprises cadmium sulfide.

6. A light modulation element as claimed in claim 1, wherein one of the substrates comprises transparent insulating material, the electrode on the substrate of transparent insulating material is transparent, and the electrode on the other substrate comprises metal having a high reflection factor.

7. A light modulation element as claimed in claim 1, wherein one of the substrates comprises transparent insulating material, the electrode on the substrate of transparent insulating material is transparent, the other of the substrates comprises metal having a high reflection factor, and the other electrode comprises the metal substrate.

8. A light modulation element as claimed in claim 1, further comprising light input means for introducing light into the layers of semiconductor material having the Franz-Keldysh effect, and light output means for deriving modulated light from the layers of semiconductor material.

9. A light modulation element as claimed in claim 1, further comprising a film having an interference effect between the layers of semiconductor material having the Franz-Keldysh effect.

10. A light modulation element as claimed in claim 8, wherein the light input means and the light output means comprise film light guides optically coupled with the layer of semiconductor material on the substrate.

11. A light modulation element as claimed in claim 9, wherein the film having an interference effect comprises glass.

12. A light modulation element as claimed in claim 10, wherein each film light guide comprises the corresponding layer of semiconductor material.

13. A light modulation element as claimed in claim 10, wherein the light input means comprises first light coupling means introducing light into a first layer of semiconductor material, and the light output means comprises second light coupling means deriving the modulated light from a second layer of semiconductor material.

14. A light modulation element as claimed in claim 13, wherein the light coupling means of the light input means and the light output means comprise a light coupler selected from the group consisting of prism couplers, grating couplers and taper couplers and the light coupling means are on the film light guides.

* * * * *